R S. HARRIS.
Car-Track Clearer.

No. 67,049.

Patented July 23, 1867.

Witnesses.
Theo Tusche
J A Service

Inventor.
R. S. Harris
Per Munn & Co

United States Patent Office.

R. S. HARRIS, OF DUBUQUE, IOWA.

Letters Patent No. 67,049, dated July 23, 1867.

IMPROVED SNOW-PLOUGH.

The Schedule referred to in these Letters Patent and making part of the same.

TO ALL WHOM IT MAY CONCERN:

Be it known that I, R. S. HARRIS, of Dubuque, in the county of Dubuque, and State of Iowa, have invented a new and improved Snow-Plough; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved apparatus, by means of which the snow may be readily removed from the track and thrown to a sufficient distance at one or both sides of the said track to be wholly out of the way; and it consists in the combination of one or more pivoted inclined elevator-boxes with the supporting car; in the combination of an endless chain of buckets with the elevator-boxes; in making the scoop flaring, so as to gather in and remove the snow for a sufficient distance upon each side of the track; in the combination of a snow or ice-cutter with the frame of the scoop; in the combination of an ice-cutter with the frame of a car or truck; and in the combination of guide-wings with the outer ends of the elevator-boxes to give the snow an outward direction in its descent.

Figure 1:
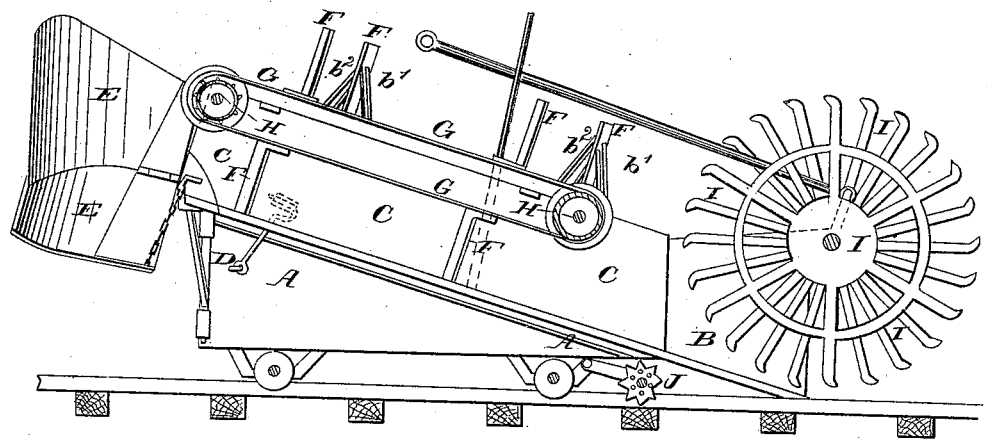
Figure 1 is a side view of my improved snow-plough, partly in section through the line $x\,x$, fig. 2.
Figure 3:
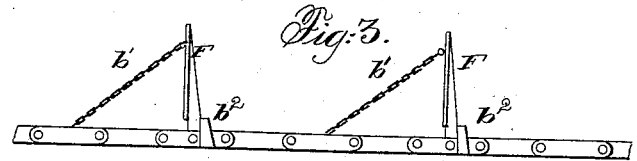
Figure 3 is a detail view, showing one way of constructing the endless chain of buckets.
Figure 2:
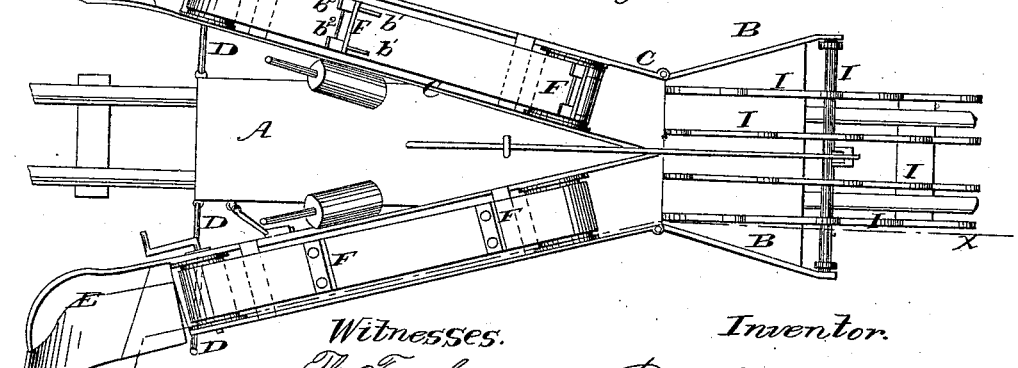
Figure 2 is a top or plan view of the same.

A is the car, the outer side of which is made inclined, and which may be attached to and driven by a locomotive engine, or may have the power attached to itself, or it may be driven by horses, as may be desired or convenient. To the forward end of the car is attached a scoop, B, the sides of which are made flaring, so as to reach and gather the snow for a sufficient distance outside of the track. C are the elevator-boxes, one or two of which may be used, as may be desired. The boxes C extend up along the inclined top of the car A, and are hinged or pivoted at their lower ends to the forward end of the car A or to the frame of the scoop B, so that their upper ends may be swung inward in passing through narrow passages, and again swung outward to convey the snow to the outside of the track. The upper ends of the boxes C rest and slide out and in upon cranes D, pivoted to the rear end of the car A, as shown in figs. 1 and 2. The boxes C should be so arranged that the snow may be received into either or both, so as to be discharged upon either or both sides of the track, according as the construction of the road may render most convenient. In case only one elevator-box is used, it should be so pivoted that it may discharge the snow upon either side of the road, as may be desired. E are wings or chutes, which may be removably or rigidly attached to the rear ends of the elevated boxes C to give the snow an outward direction in its descent, so as to carry it farther outside of the track. F are the buckets or elevators, which may be attached to endless belts G, as shown in figs. 1 and 2, or to endless chains, as shown in fig. 3. The buckets F may be strengthened by chains $f^1$ and braces $f^2$ if desired or thought necessary. The endless belts or chains to which the buckets F are attached may pass over and receive motion from rollers or pulleys H, to which motion may be given from the driving power by any of the ordinary means for transmitting motion. I is an ice or snow-cutter, pivoted to the frame of the scoop B, and designed to be used when the snow is stiff, or when ice or crust has been formed upon it, and to which a rapid motion may be given by connecting it to the driving power by suitable gearing. The cutter I may be formed by attaching radial arms, having cutter-heads or teeth formed upon their outer ends, to a shaft, as shown in figs. 1 and 2. J is an ice-cutter, attached to the truck or car-frame A, and driven with a rapid motion by being geared to the axle of the truck or to the driving power, as may be convenient. The cutter J is designed to be used for cutting away the ice from the rails, so that the wheels may have a free chance to work.

What I claim as new, and desire to secure by Letters Patent, is—

The combination of the inclined supporting car A, inclined elevator-boxes C, endless chain of buckets F, flaring scoop B, ice and snow-cutters I J, and guide-spouts E, substantially as described for the purpose specified.

R. S. HARRIS.

Witnesses:
   W. WEIGLEY,
   FILLMORE WEIGLEY.